July 14, 1959 C. G. SÖDERBAUM 2,895,007
TELEPHONE INSTALLATION
Filed Oct. 24, 1956
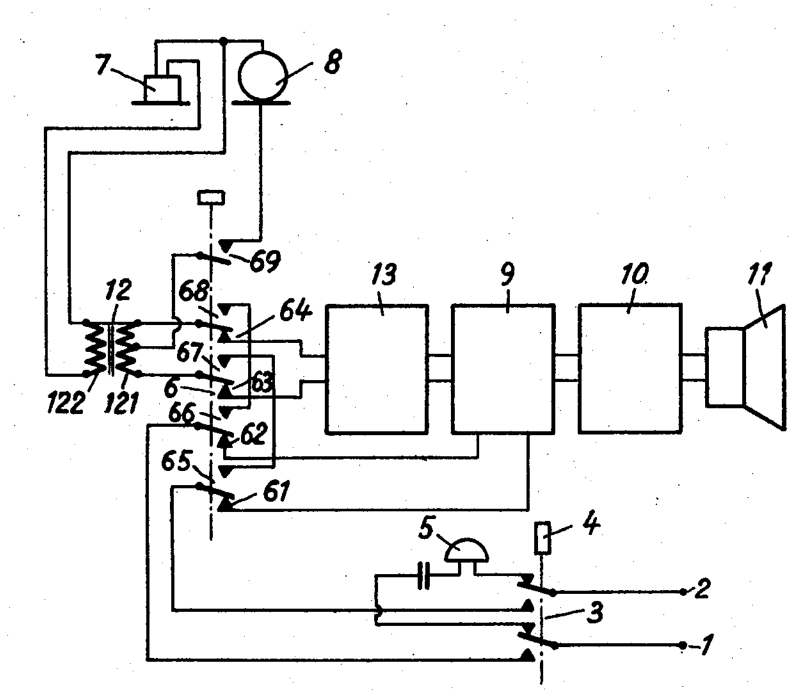
INVENTOR
CARL GUSTAF SÖDERBAUM
BY Hane and Nydick
ATTORNEYS

United States Patent Office 2,895,007
Patented July 14, 1959

2,895,007

TELEPHONE INSTALLATION

Carl Gustaf Söderbaum, Stockholm, Sweden, assignor to Telefonaktiebolaget L M Ericsson, Stockholm, Sweden, a corporation of Sweden Application October 24, 1956, Serial No. 618,156

Claims priority, application Sweden November 3, 1955

4 Claims. (Cl. 179—1)

The present invention refers to a telephone installation equipped with a hand set and arranged to work together with an amplifier, a microphone and a loudspeaker as a loud-speaking telephone instrument, whereby, selectively, sound can be transmitted either through the handset or the loudspeaker.

Such telephone instruments are previously known, and a number of constructions have been proposed and in many different ways attempts have been made to solve the acoustic, electro-magnetic and purely practical problems attached to the conception of a loud-speaking telephone. Extra microphones have been tried, placed in a certain manner relatively the loud-speaker and with special properties of direction. Specially shaped telephone casings have further been tried, being so constructed that the hand set can be placed in two considerably different positions, an extra microphone then being connected to the receiver of the hand set in one of these positions. However, it has been found that such constructions and others either differs considerably from usually existing types of telephone instruments, which makes them clumsy and expensive in manufacturing as well as in operating or otherwise they do not satisfy the demands of quality, which nowadays are made upon a telephone instrument as far as the sound transmission is concerned.

A telephone instrument according to the present invention differs very little from usual telephone instruments as regards the construction and thus being comparatively simple and cheap in manufacturing and numerous experiments have shown, that the quality of the sound transmission is very good when the instrument is used as a loud-speaking telephone. A telephone instrument according to the invention is characterized by the said microphone being the receiver of the hand set which receiver via contacts in the switch hook of the telephone instrument when the hand set rests upon the hook, is connected to the input side of an amplifier, the output side of which being connected to the connection line of the telephone instrument, but when the hand set is lifted, is connected over the last mentioned amplifier and thus works as a normal receiver.

The invention will be described more in detail in connection with the attached drawing which shows an embodiment of a telephone instrument according to the invention. It has to be observed, that for the sake of clearness, the drawing does not include various details which are well known from ordinary telephone instruments and necessary for the functino of the instrument but only those details that are essential for the clarifying of the scope of the invention have been included.

A connection line to the telephone instrument is indicated by 1, 2. A switch 3 controlled by a push button 4 connects in the upper position of the switch as shown on the drawing, line 1, 2 to the signal means 5 of the telephone instrument and in the lower position of the switch to contacts in the switch hook 6 of the telephone instrument. The instrument included in the usual way, a hand set 7—8, comprising a receiver 7 and a microphone 8. When the hand set is resting upon the hook or cradle and the switch 3 is in its lower position, the connection line 1, 2 is connected over the contacts 61—62 in the switch hook to a differential transformer 9, which has an output connected to a loudspeaker 11 via an amplifier 10 and an input connected to a winding 121 in a transformer 12 via an amplifier 13 and contacts 63—64 in the switch hook 6. The remaining winding 122 of the transformer is connected to the receiver 7, and the microphone 8 is included in a circuit, that comprises half the winding 121 and a contact 69 in the switch hook, which contact is broken in the shown position of the switch hook.

When the telephone instrument is to be used as a loud speaking telephone the button 4 is pressed down. The hand set may remain in its position on the switch hook. Talking currents, coming from outside, pass then the contacts 61—62, the differential transformer 9, the amplifier 10 and the loud speaker 11. Talking currents, coming out of the telephone instrument, are generated in the receiver 7 and pass the transformer 12, the contacts 63—64, the amplifier 13, the differential transformer 9, the contacts 61—62 and the connection line 1, 2.

When the hand set 7—8 is lifted from the switch hook 6, the contacts 61, 62, 63 and 64 will be broken and the contacts 65, 66, 67 and 68 will instead be closed, the contacts 61 and 65, 62 and 66, 63 and 67 as well as 64 and 68 having a common movable contact part. The contacts 65 and 67 as well as 66 and 68 are mutually inter-connected. The contact 69 will be closed, whereby the microphone 8 will be connected to the transformer 12.

When using the telephone instrument as an usual communication instrument the button 4 must be pressed down and the hand set 7—8 be lifted. The talking currents coming from outside pass now the contacts 65—66, the contacts 67—68, the transformer 12 and the receiver 7. The talking currents coming out of the telephone instrument are generated in the microphone 8 and pass the winding 121, the contacts 57—68, the contacts 65—66 and the connection line 1, 2.

I claim:

1. In a telephone installation for selectively transmitting sound through the handset of a telephone instrument and a loudspeaker respectively, in combination, a telephone instrument comprising a removable handset including a microphone, a receiver and a multiple switching means controlled by the position of the handset relative to the instrument, said handset moving said switching means from one position into another upon lifting the handset from and placement upon the instrument, a loudspeaker, a transmission line connected to the instrument, first circuit means connecting the transmission line through said switching means to said receiver and said loudspeaker when the handset is placed upon the instrument, said receiver then acting as microphone, and second circuit means connecting the transmission line through said switching means to the microphone and the receiver of the handset when the latter is lifted from the instrument, the microphone and the receiver then acting as microphone and receiver respectively.

2. A telephone installation according to claim 1 and further comprising signal means, signal switch means included in said transmission line and biased into a position connecting said signal means to said transmission line and disconnecting said multiple switching means from the line, and actuating means for moving the signal switching means into another switching position disconnecting the signal means from the line and connecting the multiple switching means thereto.

3. In a telephone installation for selectively transmitting sound through the handset of a telephone instrument and a loudspeaker respectively, in combination, a telephone instrument comprising a removable handset including a microphone, a receiver and a multiple switching means controlled by the position of the handset relative to the instrument, said handset moving said switching means from one switching position into another upon lifting of the handset from and placement upon the instrument, a loudspeaker, a transmission line connected to the instrument, a differential transformer, first circuit means including a first amplifying means and connecting said transmission line through said switching means and said transformer to the receiver and the loudspeaker when the handset is placed upon the instrument, said receiver then acting as microphone, and second circuit means including a second amplifying means and connecting the transmission line through said switching means and said transformer to the microphone and the receiver of the handset when the latter is lifted from the instrument, the microphone and the receiver then acting as microphone and receiver respectively.

4. A telephone installation according to claim 3 and further comprising signal means, signal switch means included in said transmission line and biased into a position connecting said signal means to said transmission line and disconnecting said multiple switching means from the line, and actuating means for moving the signal switching means into another switching position disconnecting the signal means from the line and connecting the multiple switching means thereto.

References Cited in the file of this patent

UNITED STATES PATENTS 2,801,287 Clemency ---------------- July 30, 1957